Figure 5:
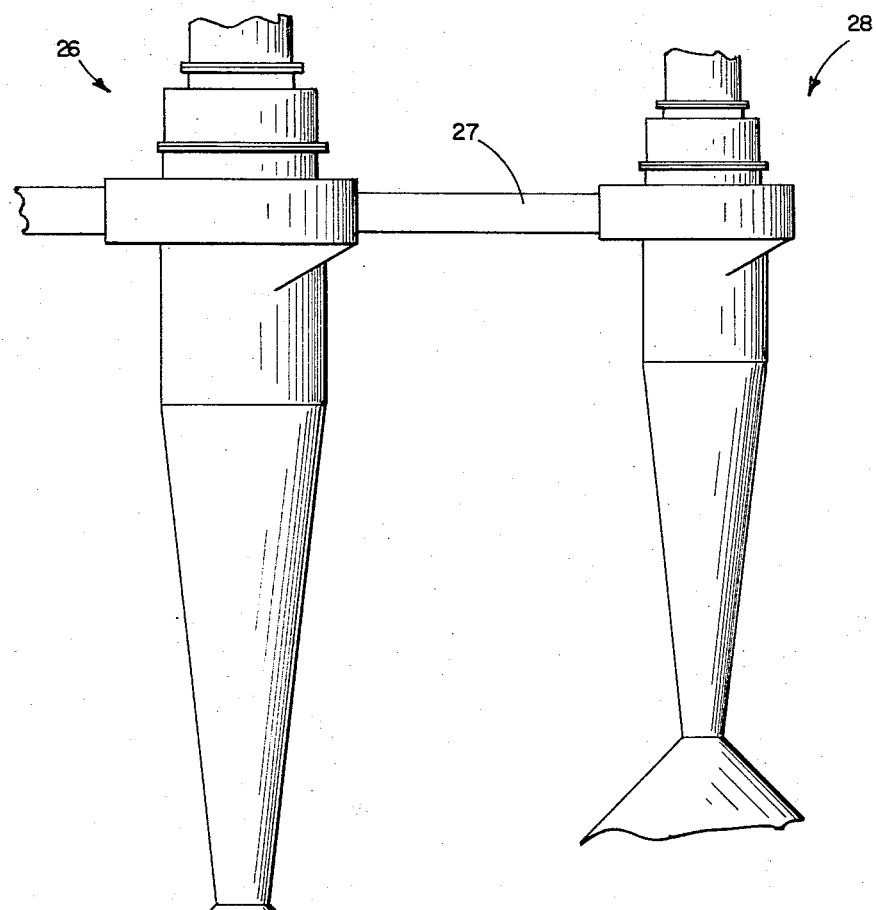

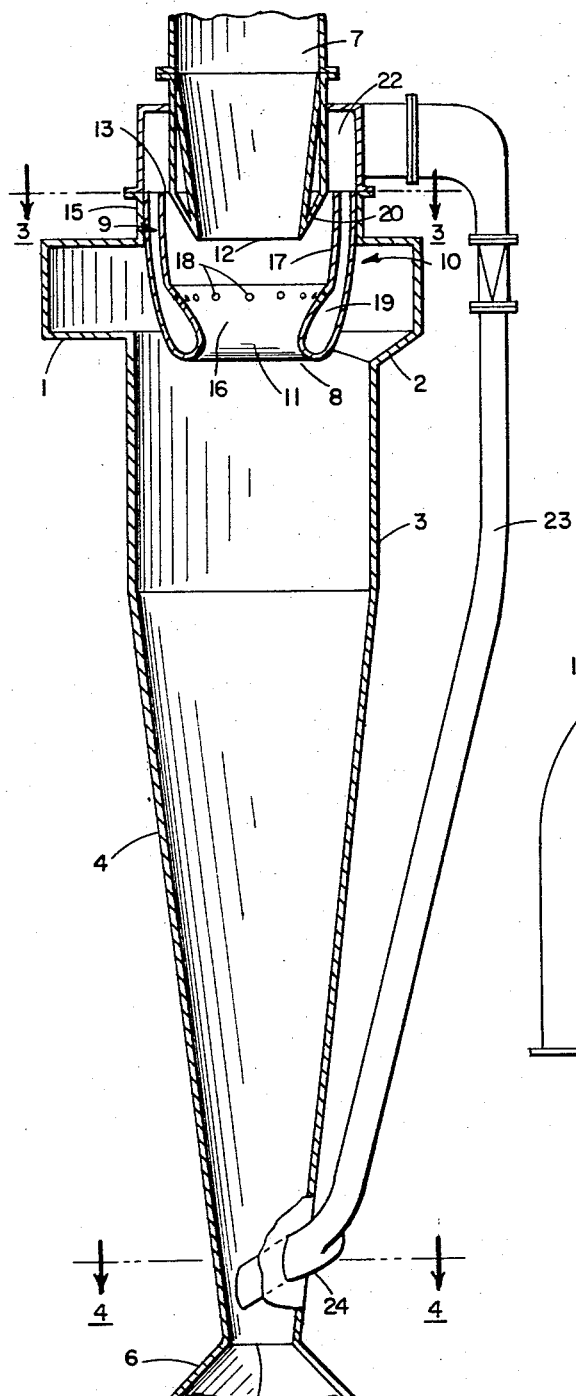
FIG. 1
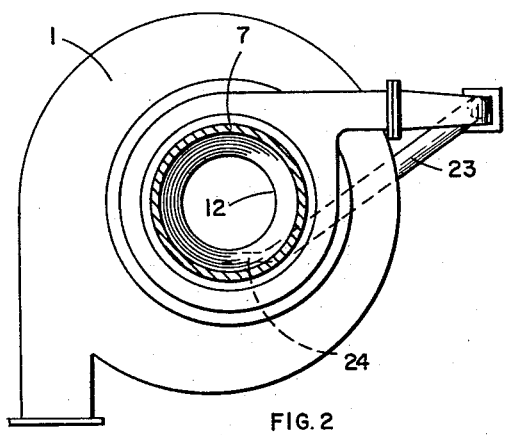
FIG. 3
FIG. 2
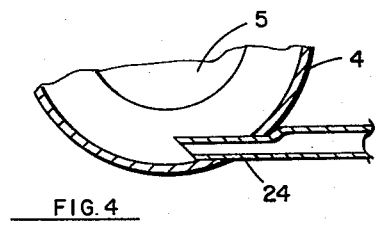
FIG. 4
INVENTOR.
JULIAN MORAWSKI
ATTORNEYS Feb. 27, 1968  J. MORAWSKI  3,370,407
GAS CLEANING DEVICE Filed July 8, 1963  4 Sheets-Sheet 2

INVENTOR.
JULIAN MORAWSKI
BY
ATTORNEYS

Feb. 27, 1968 J. MORAWSKI 3,370,407
GAS CLEANING DEVICE
Filed July 8, 1963 4 Sheets-Sheet 4

INVENTOR.
JULIAN MORAWSKI
BY
ATTORNEYS

United States Patent Office 3,370,407
Patented Feb. 27, 1968

3,370,407
GAS CLEANING DEVICE
Julian Morawski, 1507 Pacific Ave.,
Manhattan Beach, Calif. 90266
Filed July 8, 1963, Ser. No. 293,431
1 Claim. (Cl. 55—413)

This invention pertains to an arrangement for separating particulate material from a gas, and more particularly to a separator of the centrifugal, or cyclone, type.

The desirability of removing solid particles from gases emitted into the atmosphere of industrial areas is well known. Damage to vegetation and buildings can be extensive, while the health of the residents may be adversely affected. Cleaning of gases discharged into the atmosphere, therefore, has become recognized as a necessity in the present industrialized society.

One of the simplest and most economical to construct and operate of the various known separating devices is the centrifugal or cyclone type of separator, wherein the dust laden gases are rotated at high velocity thus permitting removal of the heavier solid particles by centrifugal force. However, the inability of these devices to remove particles of a very fine size, and their relatively low efficiency and lack of consistency in separation even of larger particles, has limited the use of cyclone type separators. Many efforts have been made to improve the performance of these units, such as by conducting portions of the gas to auxiliary separating devices, or by including various baffles in the hope of altering the flow within the separator in a manner which would improve the ability of the separator to remove dust from the gas. These schemes have increased the size and complexity of the separator assemblies, yet have not materially added to their efficiency. Therefore, cyclone separators have not been utilized where top performance is required.

It has been possible to remove the greatest percentages of particulate matter by means of electrical devices which precipitate the solid particles from the gas. However, these electrical separators are extremely costly to purchase and maintain. Many of them will not operate properly on heavy dust concentrations and require additional units in the form of mechanical separators for precleaning the gas before it is sent to the electrical precipitator. Another factor adding to the size and expense of the electrical separators is their requirement for low gas velocities past the electrodes. Furthermore, these units do not operate properly at elevated temperatures which in many instances necessitates the provision of extra equipment for cooling the gases. Also, corrosive gases or liquids materially shorten the life of the electrodes and reduce their effectiveness. Furthermore, while these electrical separators are generally efficient in their separation of most solid particles from the gases, they are somewhat less effectual for gases containing dusts with high concentrations of carbon.

Other separating devices also have inherent shortcomings. The bag type, having fabric filtering media, cannot be used for high temperature gases and requires low gas velocities. These devices are subject to considerable wear and consequently have a short life and require high maintenance expense.

Gas washers and scrubbers also are utilized in cleaning gases, but they demand a large supply of water which is not always available. Also, they require compressors, pumps, driving machinery and the like, all of which involve expense, maintenance difficulties and space requirements. Disposal of the sludge produced by these separators presents a troublesome problem.

The device of this invention overcomes the deficiencies of the prior art by providing an improved cyclone separator having an efficiency comparable to that of precipitators without their limitations and costliness. The separator of this invention includes an arrangement for removing material from the vicinity of the clean gas outlet for subsequent separation of the solid constituents. The peripheral portions of the gas approaching the outlet will contain a relatively high percentage of particulate matter that in conventional units would escape to the atmosphere. The invention includes an annular passageway surrounding the clean gas outlet pipe for receiving such outer portions of the upwardly rising gas. This passageway incorporates a diffuser to conserve the energy of the moving gas. From the diffuser outlet, the gas again is subjected to an operation to remove the solid material entrained with it. Usually the diffuser is connected to a bypass that discharges the material into the lower end of the separator in a rotating pattern. As one feature of this invention, peak efficiency of diffusion is attained by means of a boundary layer control arrangement in the diffuser. This prevents flow separation from the diffuser wall, resulting in a maximum amount of diffusion for a relatively short length axially. The result is a high pressure rise without significant loss of energy, with the assurance that adequate pressure will be available for recirculating the gas and particulate material bled off through the bypass.

Accordingly, it is an object of this invention to provide an efficient, simplified, low cost cyclone separator.

A further object of this invention provides an arrangement for obtaining peripheral portions of the gas adjacent the clean gas outlet for subsequent separation of particulate material, including a high efficiency diffuser at the location where the gas is received.

An additional object of this invention is to provide a cyclone separator having an annular diffuser in the vicinity of the clean gas outlet, with the diffuser incorporating boundary layer control means to preclude separation of the fluid stream from the walls of the diffuser.

A further object of this invention is to provide a cyclone separator which takes advantage of the natural flow phenomenon inside of the separator to remove gases having heavy dust concentrations from the area of the gas outlet, and discharge these gases in the portion of the separator of most efficient operation and in such a manner as to increase the rotational velocity within the separator.

An additional object of this invention is to provide a cyclone separator having provision for recirculating dust-laden gases in order to increase the probability of separation of particulate material.

Yet another object of this invention is to provide a cyclone separator which subjects the gas to only a very low pressure loss.

Still another object of this invention is to provide a cyclone separator having a lower cut size of removable particles than conventional design, and capable of removing a higher percentage of particles above the cut size than can be accomplished by other separators.

Figure 6:
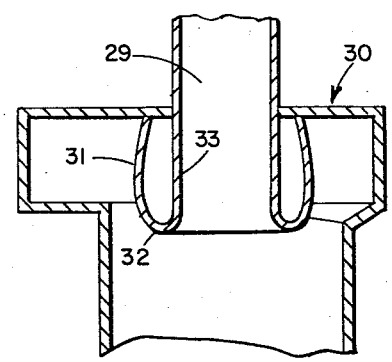
Figure 7:
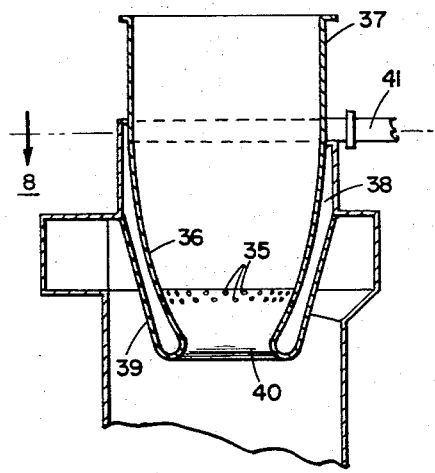
Figure 12:
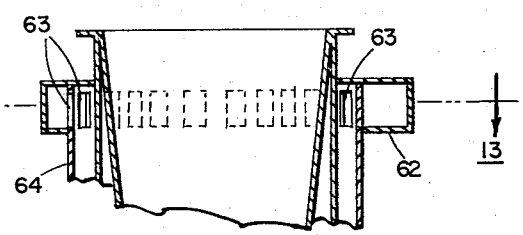
Figure 13:
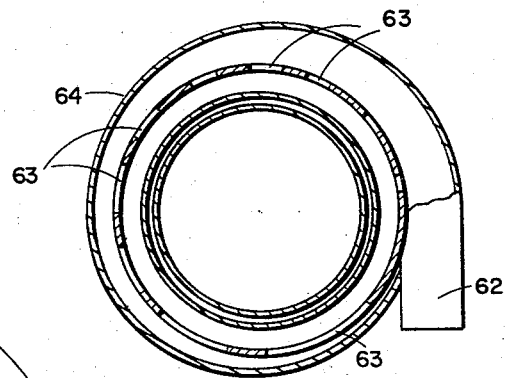
Figure 8:
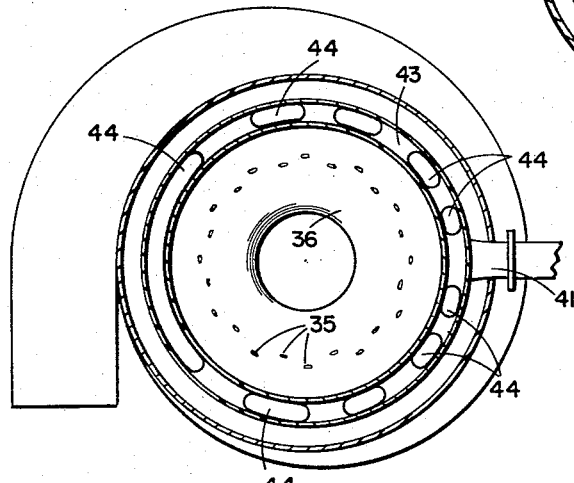
Figure 9:
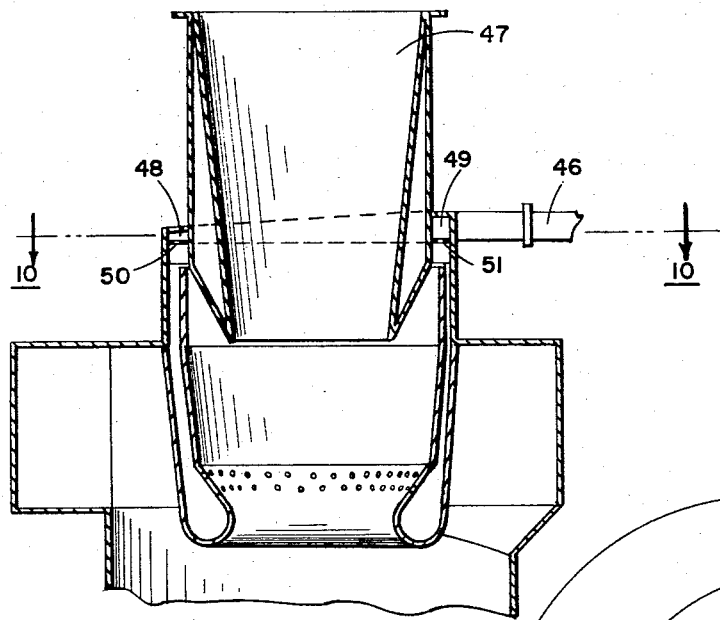
Figure 10:
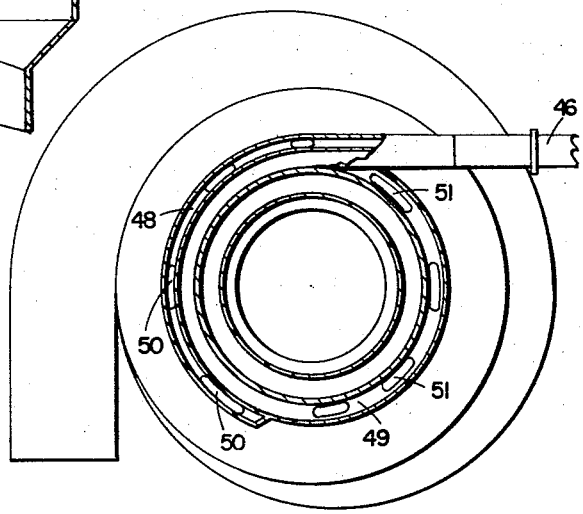
Figure 11:
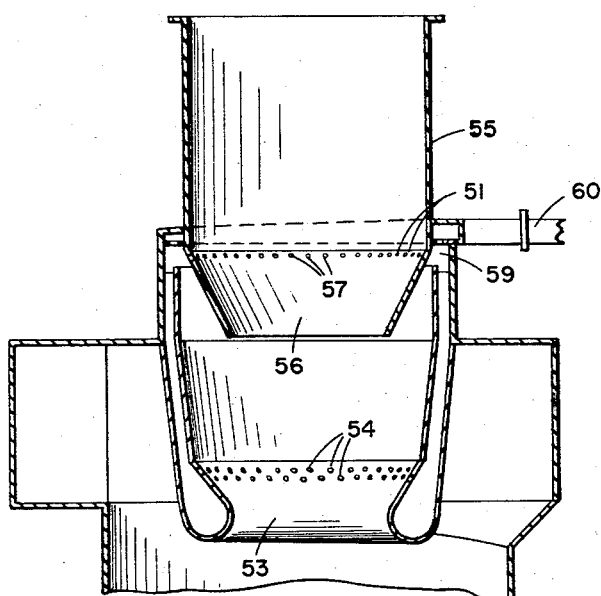

These and other objects will become apparent from the following detailed description taken in connection with the accompanying drawing in which:

FIG. 1 is a longitudinal sectional view of a cyclone separator incorporating this invention, FIG. 2 is a top plan view of the arrangement of FIG. 1, FIG. 3 is an enlarged fragmentary transverse sectional view taken along line 3—3 of FIG. 1 showing the top portion of the diffuser unit, FIG. 4 is an enlarged fragmentary sectional view taken along line 4—4 of FIG. 1 illustrating the outlet of the bypass line, FIG. 5 is an elevational view of a modification in which the diffuser outlet connects to a second separating device, FIG. 6 is an enlarged fragmentary longitudinal sectional view of a simplified form of the invention having no provision for recirculation or secondary separation of particulate material, FIG. 7 is a fragmentary longitudinal sectional view of a cyclone separator having boundary layer control in the entrance to the clean gas outlet, and including an arrangement to equalize the boundary layer removal around the circumference of the diffuser, FIG. 8 is an enlarged transverse sectional view taken along line 8—8 of FIG. 7, FIG. 9 is a longitudinal view of a cyclone separator in which the pressure balancing of the boundary layer openings includes two inlets to the bypass line, FIG. 10 is an enlarged transverse sectional view taken along line 10—10 of FIG. 9, FIG. 11 is a fragmentary longitudinal sectional view of a separator provided with two diffusers, each of which incorporates a boundary layer control feature, FIG. 12 is a fragmentary longitudinal sectional view of a separator having a different form of pressure balancing slots, and FIG. 13 is an enlarged transverse sectional view taken along line 13—13 of FIG. 12.

With reference to the drawing, there may be seen in FIG. 1 a longitudinal sectional view of a cyclone separator embodying the principles of this invention. This arrangement includes an inlet scroll 1 receiving the dust-laden gas which is discharged into the interior of a separator in a rotating pattern. The lower wall 2 of the inlet scroll has a helical shape to assist in imparting downward movement to the gas and dust entering the separator. The gases and dust from the scroll enter a relatively short cylindrical section 3 which connects to the top end of a frustoconical lower portion 4. A central outlet 5 at the bottom end of portion 4 leads to a hopper 6 that is adapted to receive particulate material separated from the gas. A second outlet 7 at the upper axial end of the separator receives the clean gas from which the particles have been removed.

A detailed discussion of the phenomena occurring within a cyclone separator may be found in my previously issued Patent No. 3,060,664. In general, the separator operates on the principle of removing the particulate material from the gas by means of centrifugal force. Being heavier than the gas, the solid matter is thrown outwardly against the walls of the separator and travels downwardly to where it can enter the hopper. The clean gas rises from the lower end of the separator, forming an upwardly moving core at the axis of the unit which enters the outlet at the upper end of the separator.

However, in conventional separator designs a certain amount of particulate material always leaves the unit along with the gases. Some particles may be drawn into the central ascending core of the clean gas by the strong inward radial vortex gas flow component. This is, of course, more likely to occur with particles of smaller mass, which will be less influenced by the effect of centrifugal force from rotation within the separator. Also, at the vicinity of the clean gas outlet the tangential velocity of the incoming dust-laden gas is at its minimum. Therefore, the centrifugal force will be relatively small, permitting the forces exerted by the rising gas to drag some of the particles into the gas outlet. In addition, there exists at the inlet scroll a rotating annulus of the dust-laden gas received from the inlet opening. Local rotation about the circumferential axis is present in this ring of dust and gas, as well as the movement about the axis of the separator. The local rotation drives particulate material against the separator wall and the exterior of the clean gas outlet pipe. These solid particles creep along the exterior of this pipe until reaching the vicinity of its bottom edge, where they are drawn into the upwardly rushing stream of cleaner gases.

As a result of such factors, cyclone separators have not realized the degree of efficiency required for many installations. Even separation down to the theoretical cut size cannot be accomplished in conventional designs.

According to the provisions of this invention a diffuser unit 8 is provided adjacent the clean gas outlet tube 7 that extends into the upper end of the separator. This diffuser unit may be manufactured from a single piece of sheet metal, suitably contoured to provide an inner wall 9 and an outer wall 10. The entrance 11 to the diffuser unit, where walls 9 and 10 join, is disposed beneath the inlet 12 to the clean gas outlet 7. The diffuser inlet is rounded, as illustrated, so that gases can enter the diffuser with negligible frictional losses. The exit 13 of the diffuser unit is disposed above the opening 12 and as a result the upper portion of the unit 8 circumscribes a portion of the outlet conduit 7 as well as its inlet 12. Support for the diffuser may be provided by a plurality of spaced tabs 14 extending inwardly from the upper wall portion 15 of the housing. These tabs may be welded in place to give a firm support, yet they do not appreciably obstruct free flow of gases in the separator.

The inner wall 9 of unit 8 includes a lower portion 16 that flares outwardly at a relatively wide angle with respect to the axis of the cyclone. It is here that the main diffusion takes place and the velocity of the gases is reduced with attendant static pressure rise. Additional diffusion may take place in the less divergent upper section 17 of unit 8, or this portion may be of constant cross section in some instances, giving no further diffusion. A plurality of openings 18 is provided in the wall portion 16, being in communication with the space 19 between the walls 9 and 10.

The entrance portion of the clean gas outlet 7 also may be of double-walled nature, including an outwardly flaring section 20 inclined toward the exit 13 of the diffuser unit. This provides a restriction at the exit 13.

The outlet 13 of the unit 8 communicates with a chamber 22 that in turn leads to a bypass conduit 23. The latter element extends downwardly, entering the bottom portion of the cyclone adjacent the aperture 5 for the particulate material. The outlet 24 of the line 23 is inclined downwardly toward the opening 5 while also being arranged to discharge substantially tangentially with respect to the wall of the lower portion 4 of the cyclone (see FIG. 4). In order to minimize interference with the main body of gases in the separator, the outlet portion 24 may be flattened, as illustrated, to provide a narrow stream along the wall 4. The recirculated gases from line 23 will in this manner enter the bottom of the separator where rotational velocity is greatest and efficiency of separation is at its highest.

From the foregoing, it can be seen that the central rising column of relatively clean gas will enter the opening 11 at the lower end of the diffuser unit 8. This current of gas and small amounts of particulate matter will be diffused upon entry into unit 8, with the peripheral portions of the stream moving along the diverging wall of the lower portion 16 of the diffuser. This outer portion will include the great majority of the solid particles in the rising stream within the separator. As this portion of the mixture of the gas and solid particles passes upwardly through the upper extension 17 of the unit 8, it ultimately encounters the constriction resulting from the outwardly flaring section 20 immediately below the outlet 13. As a result, the flow is accelerated to a degree as the gases leave the diffuser unit and enter the chamber 22.

This acceleration is relatively slight, and does not begin to nullify the pressure rise accomplished in the diffuser. However, the resulting increase in velocity at exit 13 reduces the static pressure at that location. This contrasts with the relatively higher static pressure of the diffused gases at openings 18. Hence, there is a pressure differential between the location of the apertures 18 and the exit 13. Consequently, the static pressure within the zone 19 between the walls 9 and 10 is reduced, which causes some of the gases to bleed through the opening 18 into the section 19, flowing ultimately upward into the chamber 22.

This secondary gas flow plays an important part in the efficiency of the diffuser in the cyclone separator of this invention. This is because the bleed through the openings 18 prevents separation of the boundary layer of the fluid stream from the walls of the diffuser. In other words, the flow of gas through the openings 18 provides a boundary layer control by preventing static pressure rise due to retarded gas flow adjacent the surface of the diffuser wall. Consequently, a maximum diffusion is realized as the entire volume of the moving stream diverges outwardly acquiring a larger cross sectional area. Even with a diffuser of relatively short axial length the dynamic pressure of the gas entering the diffuser will nearly all be converted to static pressure at the location of the chamber 22. In the absence of the boundary layer control provided by the openings 18, there would be flow separation and the pressure recovery would be substantially less.

Another advantage realized by the design of this invention is the elimination of the restricting vena contracta at the diffuser entrance. When a fluid stream enters a reentrant pipe, whether a diffuser or not, it normally builds up a restricting annulus of static fluid adjacent the entrance due to the retarded air flow in the thickened boundary layer. This has a throat of minimum cross sectional area downstream of the entrance a distance equal to approximately one-half the pipe diameter. With the present design, however, the wall of unit 8 begins to diverge outwardly in less than this critical distance, preferably flaring outwardly at a point inwardly of entrance 11 only about .2 the diameter. With the flow deflected outwardly along the wall of the diffuser by the boundary layer bleed, the peripheral fluid is drawn away before it can form a vena contracta. Thus, the unit not only diffuses more efficiently than in prior designs, but also avoids entrance constructions that occur in conventional devices.

The exact number, size and positioning of the openings 18 will depend upon the particular diffuser dimensions and the operating conditions encountered. These apertures need not be circular, as illustrated, but may be in the form of slots or openings of any desired contour. The important consideration is that a restricted bleed passageway be provided along the diverging wall of the diffuser to allow the boundary layer gases to enter the space outward of the inner wall of the diffuser.

The diffuser arrangement of this invention is particularly desirable because the gases themselves create the reduced pressure behind the diffuser wall to cause the boundary layer to be drawn off. This comes from the restriction at the exit to the diffuser unit. Hence, the pumping is automatic and it is not necessary to provide any auxiliary device for sucking the boundary layer from the critical area.

The rounded inlet 11 of the diffuser unit gives still an additional beneficial effect. It causes the throat of the diffuser to be spaced radially inward an appreciable distance from the outer surface of wall 10 of the unit. The incoming dust-laden gases entering the diffuser circulate around wall 10 as discussed above. The double walled diffuser with its arcuate entrance, therefore, spaces the outgoing cleaned gases from those just entering the separator. Thus, the ascending axial column of gas from which the dust has been separated will not contact the rotating incoming mixture. Therefore, entrainment of incoming dust-laden gases with the upwardly rushing clean gas will be avoided, and less impurities will leave the separator.

The high pressure gases in the chamber portion 22 enter the conduit 23 and flow downwardly to the outlet 24 at the bottom end of the cyclone. This movement is caused by the pressure differential existing between the top and bottom of the separator. A difference in pressure is inherent in a cyclone separator, but a much greater value is obtained by the efficient diffusion at the upper portion of the separator. The higher the static pressure obtainable at the upper end of the cyclone, the more of the bleed gas can be recirculated.

The gas entering the lower end of the cyclone from the bypass outlet 24 discharges tangentially along the wall of the separator in a rotational pattern, thereby augmenting the rotational velocity at this location. Of course, the faster the gas is rotated in the cyclone the greater the centrifugal force on the particulate matter and the more separation that can be accomplished. Additionally, by being inclined downwardly toward the outlet 5, the recirculated gases assure that the outlet can never become blocked. In conventional cyclone separators, especially those of smaller sizes, the outlet opening sometimes will become completely obstructed as the particulate material agglomerates. When that occurs, of course, no separation can take place. In assuring that the outlet 5 is kept free the outlet 24 should be relatively close to that opening, spaced well below the axial midpoint of the separator.

It can be seen, therefore, that by the provisions of this invention the peripheral portions of the ascending relatively clean gas are diffused and recirculated through the bypass system. This means that the portion of the clean gas still having residual particles of solid material will be drawn off and sent through the separator, giving additional opportunities for the particles to be separated out. Even particles smaller than the theoretical cut size of the cyclone can be removed in this manner. As they are recirculated through the unit, the particles will agglomerate to form larger particles which can be thrown off by centrifugal force and passed into the outlet 5. This recirculation system, therefore, gives vastly improved performance to the cyclone separator.

While it is usually desired to recirculate the bleed gas from the diffusion outlet through the same cyclone separator, the invention is not limited to such arrangement. In some instances it may be preferred to conduct the diffuser discharge to a different separating device. This may be another cyclone separator, a precipitator or a washer.

Such a system may be seen in FIG. 5. Here the dust-laden gas first enters cyclone separator 26 which incorporates a diffuser of the type described above. The diffuser outlet empties into a line 27 that connects to the inlet of a second and smaller cyclone separator 28. In the latter unit the bleed gas is subjected to an additional separating operation to remove the remaining particulate matter. It can be seen, therefore, that the arrangement of this invention has versatility and can be utilized in a variety of systems.

Where cost is a major concern, the simplified design of FIG. 6 may be used, offering advantages in performance over cyclones of conventional construction. Here outlet tube 29 extends into the end of cyclone 30 for discharging cleaned gas in the usual manner. However, the portions of conduit 29 inside the cyclone are of double walled construction, similar in many respects to the arrangement of the diffuser 8. Hence, there is an outer wall 31 doubled over to form a rounded entrance 32 where it joins the inner wall 33. This construction allows the tube 29 inner diameter to be proportioned for optimum efficiency, while avoiding entrainment of inlet dust with the outflowing clean gas. The outer wall 31 spaces the swirling dust-laden inlet gases radially outward of the clean gases at the axis of the separator. Also, the rounded entrance 32 permits the flow to be smooth and laminar, avoiding losses as the gases are deflected by this element. Thus, while the marked improvement of a recirculation system is not achieved, the design of FIG. 6 provides better results than conventional designs.

The utilization of boundary layer control in increasing the efficiency of a cyclone separator is capable of several different modifications, and can be designed to fit particular situations encountered. As shown in FIG. 7, for example, boundary layer control apertures 35 are formed in the inner wall 36 of a diffuser leading to the clean gas outlet 37. Beneath the wall 36 is a chamber 38 having an outer wall 39, and it is into this passageway that the boundary layer bleed material passes. There is a rounded entrance 40 into the diffuser section, and the walls 36 and 38 are spaced apart. Hence, as in the embodiment of FIG. 1, there is a separation of the central core of relatively clean gas and the swirling, incoming, dust-laden gas. The rounded inlet allows the gas to enter the diffuser smoothly and with little pressure loss. The boundary layer bleed openings permit the diffuser wall 36 to be relatively short, yet there is full diffusion and efficient pressure recovery.

This design differs from the arrangement of FIG. 1, however, in providing boundary layer control in the conduit that forms a portion of the clean gas outlet 37, rather than in a surrounding entrance element as in the previous arrangement. In the design of FIG. 7, the material recirculated or conducted to another separating device through the bleed line 41 is only the amount that is pumped through the boundary layer openings 35.

The arrangement of FIG. 7 also includes a provision for equalizing the pressures within all portions of the chamber 38 in order to achieve a uniform boundary layer pumping effect. With the line 41 being the source of reduced pressure, there is some tendency to suck greater quantities of the material through the openings 35 on the side that the conduit 41 connects to the chamber 38. In view of the fact that the boundary layer bleed-off chamber is a relatively narrow annular passageway, there is some pressure drop around its circumference so that ordinarily less boundary layer removal would be affected at the portions of the diffuser remote from line 41.

This condition is alleviated by the arrangement best seen in the enlarged transverse sectional view of FIG. 8. Its principles are equally applicable to the other embodiments of the invention as well. By this construction, there is provided an annular plate 43 at the upper end of the chamber 38. In this plate are formed slots 44 which provide the exit openings for the chamber 38. The slots 44 on the side adjacent the outlet opening 41 are made relatively small, and the slots become progressively larger as they approach the opposite side. Therefore, there is more restriction to flow on the side adjacent the bleed outlet 41 than there is in the portion diametrically opposed to it. As a consequence, the pressures around the periphery of the chamber 38 are equalized and the boundary layer removal effect is the same throughout the periphery of the diffuser. Consequently, all comparable areas of the diffuser wall exhibit the same characteristics in deffecting the flow outwardly, and diffusion is uniform.

Another arrangement for equalizing the boundary layer control suction is illustrated in FIGS. 9 and 10. Here there is a tangential take-off to the bleed line 46. The inlet to this line, which extends around the upper portion of the cyclone outside of the clean gas outlet 47, is divided into two separate passageways 48 and 49. In the passageway 48 are slots 50 of progressively smaller size a the line 46 is approached. Similarly, in the other passageway 49 slots 51 are of graduated dimension to equalize the pressures from one end to the other. This arrangement causes the bypass to effectively connect to the bleed-off in two locations, which facilitates the pressure balancing effect.

The design of FIG. 11 may be basically the same as that of FIGS. 9 and 10, but it is provided with two diffusers, both of which utilize boundary layer control bleed-off. Thus, the lower diffuser 53 includes bleed openings 54 generally as in the construction of FIG. 1. Similarly, at the entrance to clean gas outlet 55 there is an additional diffuser 56 to enhance the pressure recovery. This diffuser likewise includes boundary layer apertures 57. The openings 57 and 54 both communicate with chamber 59, which connects to the bleed outlet 60.

A modification of the pressure balancing effect of the slots at the inlet to the bypass line is shown in FIGS. 12 and 13. Here the outlets from the boundary layer passageway are not in a transverse plane, but rather are in the longitudinal wall of the unit. Hence, leading to the bypass line 62 there are slots 63 in the longitudinal wall 64 of the bleed chamber. The slots 63 may be proportioned as before, being larger at locations remote from the line 62 to equalize the pressures throughout the periphery of the boundary layer zone.

The foregoing detailed description is to be clearly understood as given by way of illustration and example only, the spirit and scope of this invention being limited solely by the appended claim.

I claim:
1. A device for separating particulate material from a gas comprising
 a chamber having a first end,
 inlet means at said first end for discharging into said chamber in a rotational pattern in one direction a quantity of gas and particulate material,
   said chamber having an axis,
 an outlet tube at said first end extending axially therein, said chamber having an inwardly tapering second end provided with an opening adapted for connection to a receptacle for particulate material,
 and means for removing peripheral portions of the gases approaching said outlet tube,
   said means including a diffuser,
     said diffuser having an inlet axially inwardly of the end of said outlet tube,
     an inner wall adjacent said diffuser inlet,
     said inner wall diverging toward said first end,
     an outer wall surrounding said inner wall in a spaced relationship therewith defining a zone between said walls,
       said inner and outer walls being joined at the inlet to said diffuser,
       said walls being curved where they are so joined thereby to provide a rounded entrance to said diffuser,
     restricted aperture means in said inner wall for providing communication to the zone between said inner and outer walls,
     said inner and outer walls terminating at a point circumscribing said outlet tube,
     a restrictor means adjacent said termination of said inner wall for accelerating the velocity of gases adjacent the surface of said inner wall,
       thereby lowering the pressure at said termination of said outer wall for decreasing the pressuer in said zone between said walls and causing boundary layer flow through said restricted aperture means,
   and means circumscribing said outlet tube beyond said termination of said inner and outer walls for receiving material therefrom and conducting said material to a means for separating particulate matter therefrom.

(References on following page)

References Cited

UNITED STATES PATENTS

| | | | |
|---|---|---|---|
| 1,265,763 | 5/1918 | Fender | 55—451 |
| 1,267,715 | 5/1918 | Tutwiler | 55—411 |
| 1,288,126 | 12/1918 | Muller | 55—446 X |
| 1,581,462 | 4/1926 | McSweeney | 55—441 X |
| 1,708,697 | 4/1929 | Jensen | 55—413 X |
| 1,753,502 | 4/1930 | Clark | 55—417 X |
| 2,414,641 | 1/1947 | French | 55—426 |
| 2,482,362 | 9/1949 | Park | 55—392 |
| 3,060,664 | 10/1962 | Morawski | 55—431 |
| 2,837,172 | 6/1958 | Klein et al. | 209—144 X |
| 2,857,979 | 10/1958 | Van Dijck | 55—459 X |
| 2,857,980 | 10/1958 | Van Rossum | 55—339 |
| 2,918,139 | 12/1959 | Silverman | 55—410 |

FOREIGN PATENTS

| | | |
|---|---|---|
| 713,083 | 8/1954 | Great Britain. |
| 1,107,367 | 5/1961 | Germany. |
| 475,126 | 11/1937 | Great Britain. |

OTHER REFERENCES

Lachmann, G. V., editor, Boundary Layer and Flow Control, Pergamon Press, New York, 1961, vol. 1, p. 5.

FRANK W. LUTTER, *Primary Examiner.*

HARRY B. THORNTON, ROBERT F. BURNETT,
*Examiners.*

L. H. McCARTER, D. E. TALBERT,
*Assistant Examiners.*